(12) United States Patent
Kamiya

(10) Patent No.: US 6,704,321 B1
(45) Date of Patent: Mar. 9, 2004

(54) TRAFFIC SHAPER

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/262,825

(22) Filed: Mar. 5, 1999

(30) Foreign Application Priority Data

Mar. 6, 1998 (JP) .......................................... 10-055469

(51) Int. Cl.$^7$ ............................................. H04L 12/56
(52) U.S. Cl. .................. 370/412; 370/395.42; 370/235; 370/392
(58) Field of Search ................................ 370/229, 230, 370/230.1, 233, 235, 235.1, 236–237, 395.4, 397, 399, 395.42, 395.43, 412–418, 389, 392, 419, 428, 429

(56) References Cited

U.S. PATENT DOCUMENTS

| | | | | |
|---|---|---|---|---|
| 5,732,087 A | * | 3/1998 | Lauer et al. | 370/416 |
| 5,793,747 A | * | 8/1998 | Kline | 370/230 |
| 6,058,114 A | * | 5/2000 | Sethuram et al. | 370/235 |
| 6,163,542 A | * | 12/2000 | Carr et al. | 370/397 |
| 6,445,708 B1 | * | 9/2002 | Jones | 370/397 |
| 6,510,160 B1 | * | 1/2003 | Nikuie et al. | 370/412 |
| 6,526,060 B1 | * | 2/2003 | Hughes et al. | 370/395.4 |

FOREIGN PATENT DOCUMENTS

| | | |
|---|---|---|
| JP | 3-187547 | 8/1991 |
| JP | 7-212367 | 8/1995 |
| JP | 7-273773 | 10/1995 |
| JP | 8-79264 | 3/1996 |
| JP | 8-97832 | 4/1996 |
| JP | 8-125668 | 5/1996 |
| JP | 8-125669 | 5/1996 |
| JP | 8-163150 | 6/1996 |
| JP | 8-213992 | 8/1996 |
| JP | 9-83525 | 3/1997 |
| JP | 9-97831 | 4/1997 |
| JP | 9-186706 | 7/1997 |
| JP | 9-200218 | 7/1997 |
| JP | 9-200231 | 7/1997 |
| JP | 9-284290 | 10/1997 |
| JP | 10-56492 | 2/1998 |
| JP | 10-135957 | 5/1998 |
| JP | 10-215264 | 8/1998 |

OTHER PUBLICATIONS

Kaganoi, et al., "An Implementation of Cell Emission Time Scheduling Function in Traffic Shaper", 1996, p. 359.

Japanese Office Action dated Mar. 24, 1999, with partial translation.

Masaki, et. al., "A Study on Traffic Shaper for Cell–Relaying Interface", The Institute of Electronics, Information and Communication Engineers, Sep. 26–29, 1994, p. 57.

* cited by examiner

Primary Examiner—Dang Ton
Assistant Examiner—Phuc Tran
(74) Attorney, Agent, or Firm—McGinn & Gibb, PLLC

(57) ABSTRACT

A traffic shaper for absorbing a cell delay variation of cell flow in each of virtual connections in an ATM (asynchronous transmission mode) network is realized. The traffic shaper comprises a cell identification part, a cell memory, a sending-out time determination part and a cell memory control part. The cell identification part is provided for identifying a virtual connection allocated to an input cell, the cell memory is provided for storing input cells into respective virtual queues, each queue is corresponding to the virtual connection, in accordance with the identified virtual connection of each input cell, the sending-out time determination part is provided for determining a sending-out time for each cell stored in the cell memory on the virtual connection basis, and the cell memory control part is provided for performing a cell output from each virtual queue in accordance with the sending-out time determined for each cell, and performing an output competition control by selecting a cell to be output among cells having the same sending-out time in different virtual queues in accordance with a predetermined output priority assigned to each virtual connection.

8 Claims, 7 Drawing Sheets

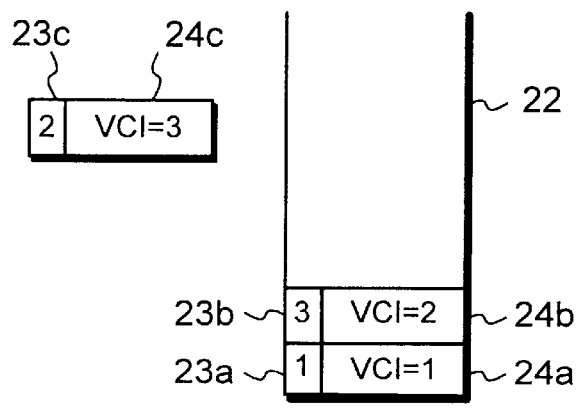
Fig.3 (A)
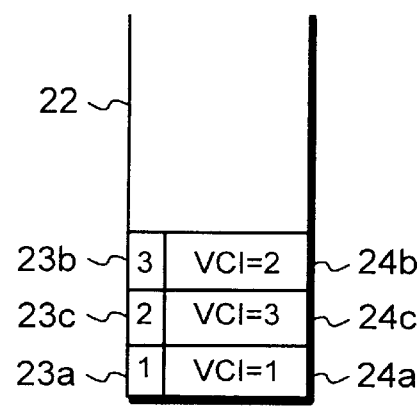
Fig.3 (B)
Fig.4
| PRIORITY | CDVT | VCI |
|---|---|---|
| 1 | 1 | 1 |
| 2 | 2 | 3 |
| 3 | 4 | 2 |
| : | : | : |
PRIORITY TABLE

Fig.5

| VCI | EMPTY | SENDING-OUT TIME | SENDING-OUT REQUEST |
|---|---|---|---|
| 1 | E | T1 | N |
| 2 | F | T2 | Y |
| 3 | E | T3 | N |
| : | : | : | : |

SENDING-OUT TIME SCHEDULE/BUFFER STATE TABLE

Fig.6

| EMPTY | E | F | E | F | F | ------- |
|---|---|---|---|---|---|---|
| TIME SLOT | 1 | 2 | 3 | 4 | 5 | ------- |

TIME SLOT/BUFFER STATE TABLE

TRAFFIC SHAPER

DETAILED DESCRIPTION OF THE INVENTION

1. Field of the Invention

The present invention relates to a traffic shaper for absorbing the cell delay variation in virtual paths (Virtual Path: VP) and virtual channels (Virtual Channel: VC) in an ATM (asynchronous transmission mode) network.

2. Description of the Related Art

Data to be transmitted is devided into a plurality of fixed-length packets, each packet is called "a cell", and those cells are transmitted in the ATM network. On a physical transmission line of the ATM network, virtual paths and virtual channels are defined for each of connections, and cells on virtual channels are multiplexed and transmitted on a virtual path.

As cells are multiplexed asynchronously, when cells pass through a multiplexing apparatus, a switch apparatus and so on, a cell delay variation (hereinafter called CDV) occurs due to the deference of queueing time in buffers in each apparatus. The CDV may cause to generate cells, each having a small cell interval, and as the result, the traffic becomes a burst condition so the coefficient of utilization of the network resources lowers.

For solving the above problem, a traffic shaper is proposed. The traffic shaper is provided for removing the CDV in multiplexed cells on virtual paths or virtual channels and shaping the cell intervals. In this traffic shaper, input cells are once stored in a buffer memory and a timing is adjusted for outputting a cell so as to have the cell interval requirede by a destination apparatus.

However, the traffic shaper dealing with plural virtual paths or virtual channels is further required a function of an output competition control. This is because that there occurs a case that cells of different virtual paths or virtual channels are present at the same output timing. The output competition control of cell is therefore required when cells of plural virtual paths or virtual channels are multiplexed and output to the transmission path. A CDV is still added at the time of the output competition control operation though it is smaller than that before inputting to the traffic shaper.

As conventional control methods of the output competition controls of cell, there are an FIFO (First In, First Out) rule and a round robin method. But, they are not considering the traffic characteristics of the virtual path or virtual channel in their control.

Among the traffic characteristics, the CDV greatly affects the coefficient of utilization of the network resources and the quality of services (hereinafter called QOS) of the virtual path or virtual channel. But in case of the output competition control which does not consider the cell delay variation tolerance (CDV Tolerance: hereinafter called CDVT) showing the allowable tolerance of CDV as a traffic, there is a possibility that a larger CDV than allowable CDV is contained for a virtual path or a virtual channel in which severe CDVT is defined.

For improving the QOS with improving the coefficient of utilization of the network resources, it is therefore necessary to realize a traffic shaping system which performs traffic shaping at the virtual path or virtual channel basis and output competition control considering the traffic characteristics of the virtual path or virtual channel.

An example of a conventional traffic shaper is described in an official gazette of Patent non-examined Publication No. Hei7-212367. The traffic shaper described in this official gazette identifies each of plurality of virtual channels included in the same virtual path by a virtual channel identifier (VCI), stores them in buffers classified by priority, and sending out cells so that the cell intervals become constant on the virtual path with performing an output competition control of cell by a priority control of buffer. In the priority control, cells in a buffer corresponding to a virtual channel in which sever CDV is defined are output preferentially, and it is intended to improve the coefficient of utilization of the network resources of the ATM network.

But in the conventional traffic shaper described in above official gazette, a technology of shaping for a virtual path basis was only disclosed, and shaping for a plurality of virtual channels in a virtual path was not disclosed. Besides, shaping for the single virtual path basis was only disclosed, and shaping dealing with plural virtual paths was not disclosed.

An example of another conventional traffic shaper is described in an official gazette of Patent non-examined Publication No. Hei8-163150. The traffic shaper described in this official gazette is provided immediately before a receiving terminal, and it is used for absorbing CDV of input cells of the receiving terminal. Therefore, a CDV absorption buffer in the receiving terminal is not required. In this traffic shaper, A CDV is removed by storing input cells in a shaping FIFO and reading out after elapsing a fixed time.

However, the conventional traffic shaper described in above official gazette is only applicable to a single input cell flow, and shaping of plural virtual paths or virtual channels are not mentioned. There was therefore a problem that shaping cell intervals for each virtual path or virtual channel was not performed. Besides, there was a problem that the coefficient of utilization of the network resources was not improved because no consideration was made for sending out cells by a priority order depending on allowable values of cell delay variation for a virtual channel.

The present invention aims, in view of the defects of the above conventional traffic shapers, to provide a traffic shaper in which cell delay variations of virtual paths or virtual channels are reduced to improve the coefficient of utilization of the network resources and traffic-shaping is performed by considering the priority of each virtual path or virtual channel for improving the quality of service of the virtual path or virtual channel.

Besides, the present invention aims to provide a traffic shaper in which traffic-shaping is performed by considering the priority of each virtual path or virtual channel based on the traffic characteristics of each virtual path or virtual channel.

Furthermore, the present invention aims to provide a traffic shaper in which traffic-shaping is performed by considering the priority of each virtual path or virtual channel based on the cell delay variation tolerance, that is one of the traffic characteristics, for more decreasing the cell delay variation of a virtual path or a virtual channel, in which a small cell delay variation tolerance is defined, in comparison with the cell delay variation of a virtual path or a virtual channel, in which a large cell delay variation tolerance is defined.

Furthermore, the present invention aims to provide a traffic shaper in which traffic-shaping is performed by considering the priority of each virtual path or virtual channel based on a peak cell rate (PCR), that is one of the traffic characteristics, for more decreasing the cell delay variation of a virtual path or a virtual channel, in which a cell flow of a large peak cell rate is contained, in comparison with the cell delay variation of a virtual path or a virtual channel, in which a cell flow of a small peak cell rate is contained.

SUMMARY OF THE INVENTION

A traffic shaper of the present invention dealing with plural virtual connections (general term of virtual path and virtual channel) for absorbing a cell delay variation of cell flow in each of virtual connections in an ATM (asynchronous transmission mode) network, and the traffic shaper comprises a cell identification part, a cell memory, a sending-out time determination part and a cell memory control part.

The cell identification part is provided for identifying a virtual connection allocated to an input cell, the cell memory is provided for storing input cells into respective virtual queues, each queue is corresponding to the virtual connection, in accordance with the identified virtual connection of each input cell, the sending-out time determination part is provided for determining a sending-out time for each cell stored in the cell memory on the virtual connection basis, and the cell memory control part is provided for performing a cell output from each virtual queue in accordance with the sending-out time determined for each cell, and performing an output competition control by selecting a cell to be output among cells having the same sending-out time in different virtual queues in accordance with a predetermined output priority assigned to each virtual connection.

Further, the cell memory control part comprises a priority table, a virtual queue state table and a cell sending-out control part, the priority table is provided for indicating the predetermined output priority for each virtual connection currently being established, the virtual queue state table is provided for indicating each virtual queue state including information of an existence of cell in the queue, sending-out scheduled time determined for the queue and a presence of cell sending-out request for the queue, and the cell sending-out control part is provided for setting a cell sending-out request for each virtual queue in the virtual queue state table when corresponding information indicating cell existence in the queue and the sending-out scheduled time is now or past, selecting a virtual queue, among virtual queues for which a cell sending-out request being set in the virtual queue state table, corresponding to the virtual connection having the highest predetermined output priority, and sending out a cell from the selected virtual queue.

Also, a traffic shaper of the present invention comprises a cell identification part, a sending-out time determination part, a cell memory and a cell memory control part.

The cell identification part is provided for identifying a virtual connection allocated to an input cell, the sending-out time determination part is provided for determining a sending-out time for each input cell on the virtual connection basis, the cell memory is provided for storing input cells into respective virtual queues, corresponding to the sending-out time, in accordance with determined time for each input cell, and the cell memory control part is provided for controlling a cell storage into respective virtual queues in accordance with the sending-out time determined for each cell and a predetermined output priority assigned to each virtual connection, and performing a cell output from each virtual queue in accordance with the sending-out time.

In this case, the cell memory control part further comprises a priority table, a sending-out time schedule table, a virtual queue state table, a cell write control part and a cell reading-out control part.

The priority table is provided for indicating the predetermined output priority for each virtual connection currently being established, the sending-out time schedule table is provided for indicating sending-out scheduled time determined for each virtual connection, the virtual queue state table is provided for indicating an existence of cell in each virtual queue, the cell write control part is provided for controlling a cell storage into respective virtual queues in accordance with the sending-out time determined for each cell and a predetermined output priority assigned to each virtual connection, and the cell reading-out control part is provided for reading-out a cell in the virtual queue indicated by a sequential reading-out pointer, and sending out the cell.

The predetermined output priority assigned to each virtual connection can be determined by an allowable cell delay variation tolerance for each virtual channel.

The predetermined output priority assigned to each virtual connection can be determined by an allowable peak cell rate for each virtual channel.

BRIEF DESCRIPTION OF DRAWINGS

FIGS. 3(A) and 3(B) is an explanatory views showing an example of a storage process operation of cells to a time slot cell queue in the third embodiment of the present invention.

FIG. 4 is an explanatory view showing an example of description of a priority table of the present invention.

FIG. 5 is an explanatory view showing an example of description of a sending-out time schedule/buffer state table of the present invention.

FIG. 6 is an explanatory view showing an example of description of a time slot/buffer state table in the third embodiment of the present invention.

DETAILED DESCRIPTION OF PREFERRED EMBODIMENTS OF THE INVENTION

Figure 1:
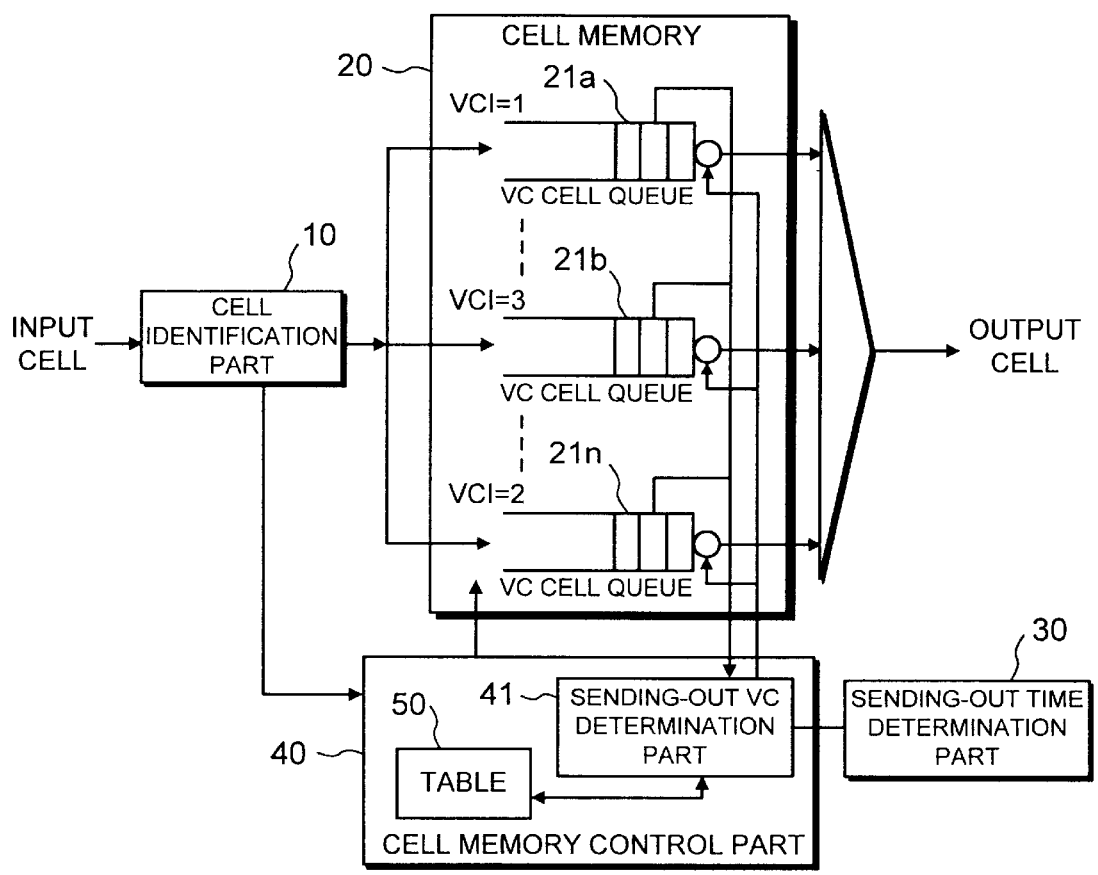
FIG. 1 is a block diagram showing the construction of a traffic shaper according to the first and second embodiments of the present invention.

Hereinafter, the first embodiment of the present invention will be described in detail with reference to drawings. FIG. 1 is a block diagram showing the construction of a traffic shaper that is the first embodiment of the present invention. Referring to FIG. 1, the traffic shaper according to the first embodiment of the present invention comprises a cell identification part 10 which identifies a virtual path identifier (Virtual Path Identifier: hereinafter called VPI) and a virtual channel identifier (Virtual Channel Identifier: hereinafter called VCI) of an input cell and identifies a virtual connection (general term of virtual path and virtual channel) on the basis of both identifiers, a cell memory 20 which temporarily stores the input cell, a sending-out time determination part 30 which determines a sending-out scheduled time of a cell of a virtual connection having arrived, and a cell memory control part 40 which controls writing and reading out a cell to/from the cell memory 20.

The cell memory 20 comprises a plurality of virtual channel cell queues (VC cell queues) 21a–n, each is a virtual queue for each virtual connection. The cell memory control part 40 comprises a table 50 which stores parameters and state of each virtual connection, and a sending-out virtual channel (VC) determination part 41 which determines a virtual connection of a cell to be sent out. Hereinafter, the detail of the structure of the table 50 will be shown.

FIG. 4 is an explanatory view showing an example of a priority table 51. FIG. 5 is an explanatory view showing an example of a sending-out time schedule/buffer state table 52. Referring to FIGS. 4 and 5, the table 50 comprises the priority table 51 on which reading-out priorities, cell delay variation tolerances (CDV Tolerance: hereinafter called CDVT) and VPI/VCI are written, and the sending-out time schedule/buffer state table 52 on which VPI/VCI, empty flags of the VC cell queue 21a–n, sending-out scheduled times of cells and sending-out request bit are written. For simplicity, VPI/VCI is shortened to VCI in the tables.

Next, the operation of the first embodiment of the present invention will be described in detail with reference to the drawings. Referring to FIG. 4, when a virtual connection is newly established, the reading-out priority is determined so that the smaller the CDVT of the virtual connection is, the higher the reading-out priority is. The priority table 51 is then renewed. In FIG. 4, a younger priority number is given to a higher reading-out priority virtual connection.

Referring to FIGS. 1, 4 and 5, when a cell arrives this traffic shaper, after the virtual connection of the cell is identified by the cell identification part 10, the cell is stored in the corresponding queue of virtual connection among the VC cell queue 21a–n. Upon storing, if the empty flag of the corresponding virtual connection of the sending-out time schedule/buffer state table 52 is empty (E), it is changed to full (F).

The stored cell is read out from the VC cell queue under instructions by an output competition control operation of the cell memory control part 40, and then output from this traffic shaper. Upon reading out, if the VC cell queue 21 of the corresponding virtual connection becomes empty, the empty flag of the corresponding VC cell queue of the sending-out time schedule/buffer state table 52 is changed from full (F) to empty (E).

Hereinafter, the operation of the output competition control of cell will be described.

Figure 7:
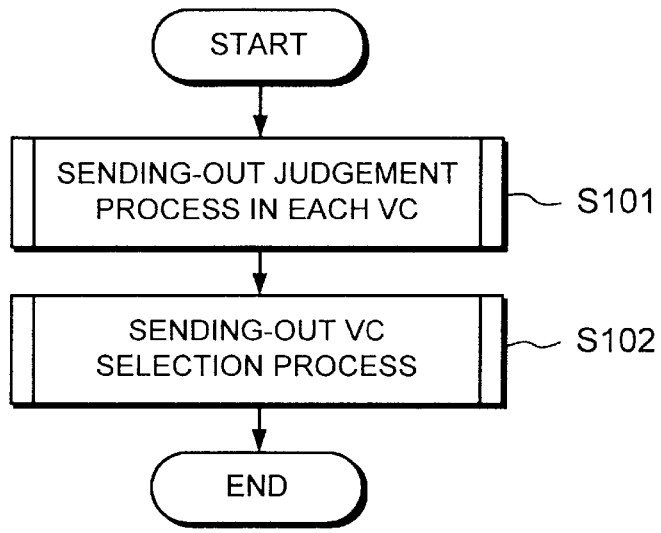
FIG. 7 is a flow chart showing the operation of an output competition control in a cell memory control part in the first and second embodiments of the present invention.

FIG. 7 is a flow chart showing the operation of the output competition control in the cell memory control part 40. This flow chart shows a process in one cell time slot. Referring to FIG. 7, first, the sending-out time schedule/buffer state table 52 is referred for each virtual connection to judge whether the present time is a time for sending out a cell (step S101). Next, a virtual connection for which a cell is to be sent out is selected in accordance with the sending-out request written in the sending-out time schedule/buffer state table 52 (step S102).

Figure 8:
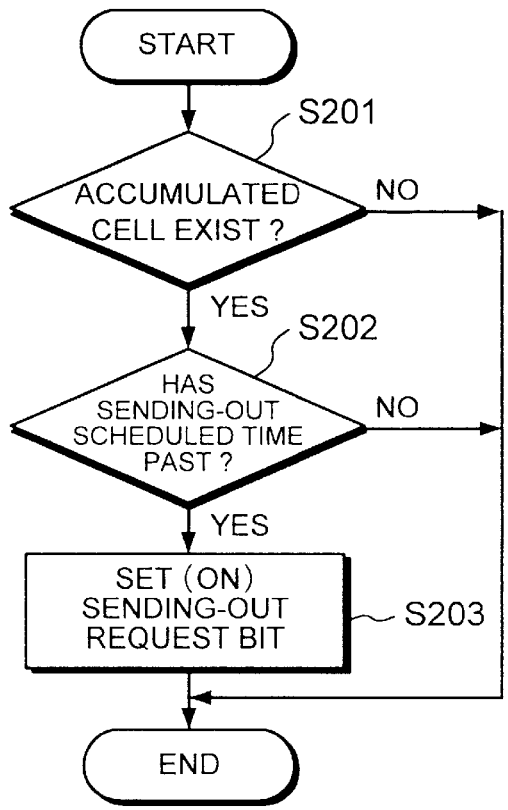
FIG. 8 is a flow chart showing a cell sending-out judgement process by virtual connection in the first and second embodiments of the present invention.

FIG. 8 is a flow chart showing a cell sending-out judgement process for each virtual connection. Referring to FIG. 8, in the beginning, the accumulation of cells to the VC cell queue is confirmed by the empty flag of the corresponding virtual connection written in the sending-out time schedule/ buffer state table 52 (step S201). In case of no accumulation (empty: E), the process is ended. In case of accumulation (full: F), the present time is compared with the cell sending-out time scheduled in the sending-out time schedule/buffer state table 52 and it is judged whether the present time is past the cell sending-out time or not (step S202). If the present time is not yet past the cell sending-out time, the process is ended. When it is past the cell sending-out time, the cell sending-out request bit of the corresponding virtual connection is set to the meaning of "ON or YES" in the sending-out time schedule/buffer state table 52 (step S203) and then the process is ended.

Figure 9:
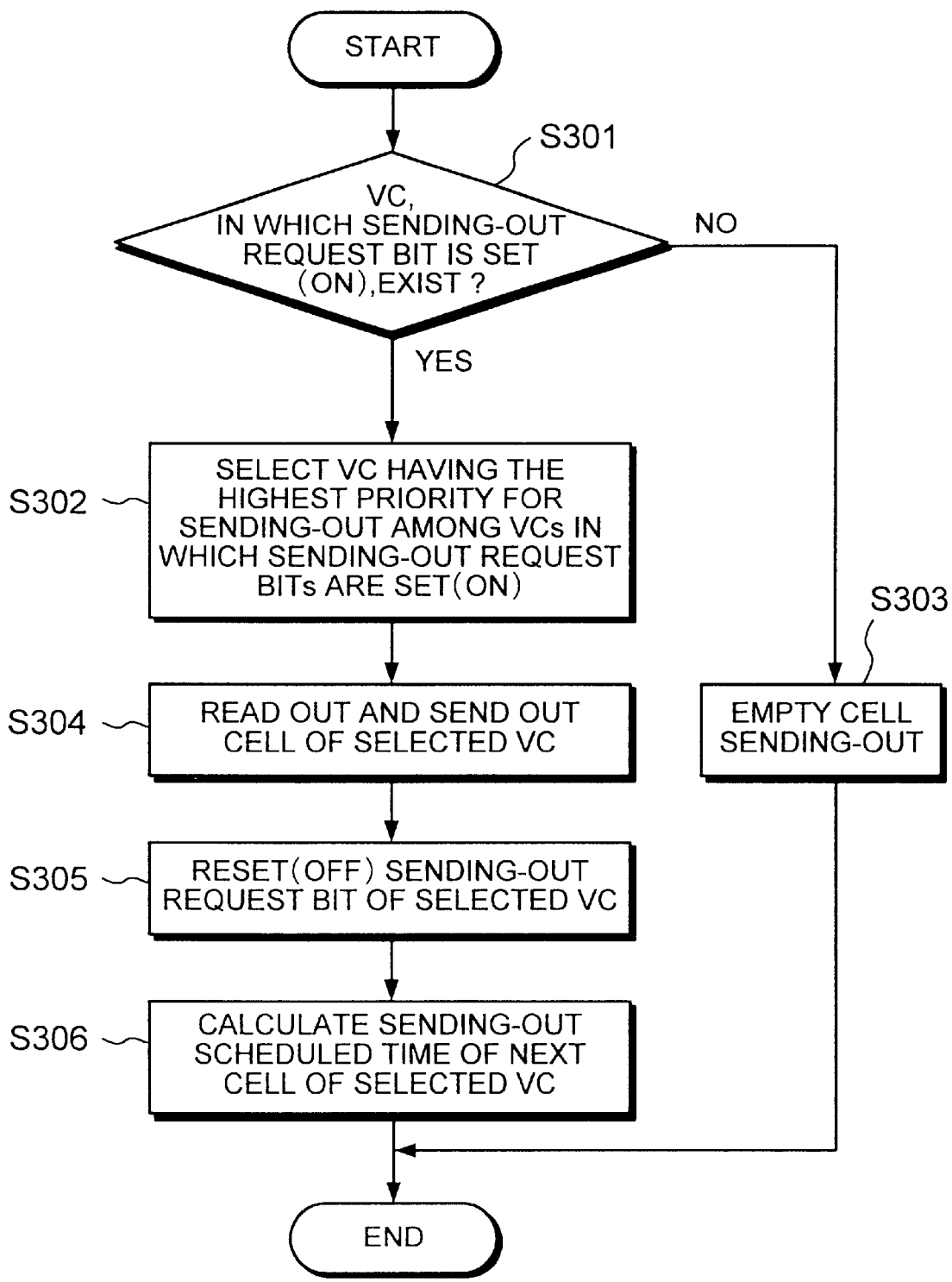
FIG. 9 is a flow chart showing a selection process of a virtual connection sending out a cell in the first embodiment of the present invention.

FIG. 9 is a flow chart showing a selection process of a virtual connection for which a cell is to be sent out. Referring to FIG. 9, in the beginning, the sending-out time schedule/buffer state table 52 is referred to confirm the presence of a virtual connection for which the sending-out request bit was set to the meaning of "ON or YES" (step S301). If no virtual connection for which the sending-out request bit was set is present, reading out a cell from the cell memory 20 is not performed and an empty cell is sent out at a cell sending-out timing (step S303) and then the process is ended. When a plurality of virtual connections each requesting a cell sending-out are present, the priority table 51 is referred to select the virtual connection of the highest reading-out priority from among the plural virtual connections (step S302), reads out a cell from the VC cell queue 21 corresponding to the selected virtual connection in the cell memory 20, and sends out the read-out cell at a cell sending-out timing (step S304).

After then, the sending-out request bit of the selected virtual connection in the sending-out time schedule/buffer state table 52 is reset to the meaning of "OFF or NO" (step S305). At the same time, the next cell sending-out time to be scheduled for the selected virtual connection is calculated in the sending-out time determination part 30 (step S306), and it is written in to the sending-out time schedule/buffer state table 52. And then, the process is ended. The calculation algorithm of the next cell sending-out time to be scheduled for the virtual connection calculated in the sending-out time determination part 30 may be a known calculation algorithm of sending-out time to be scheduled.

By the above operation, a traffic shaper, which is capable of sending out cell in accordance with the priority based on the CDVT in each a virtual connection, is realized.

Next, the second embodiment of the present invention will be described in detail with reference to the drawings.

The construction of the second embodiment is the same as that of the first embodiment of the present invention shown in FIG. 1, so the description is omitted. It means that the priority table 51 and the sending-out time schedule/buffer state table 52 are also provided for the second embodiment. And also, operations shown in FIG. 7 and FIG. 8 are applied in the same manner as the first embodiment.

Figure 10:
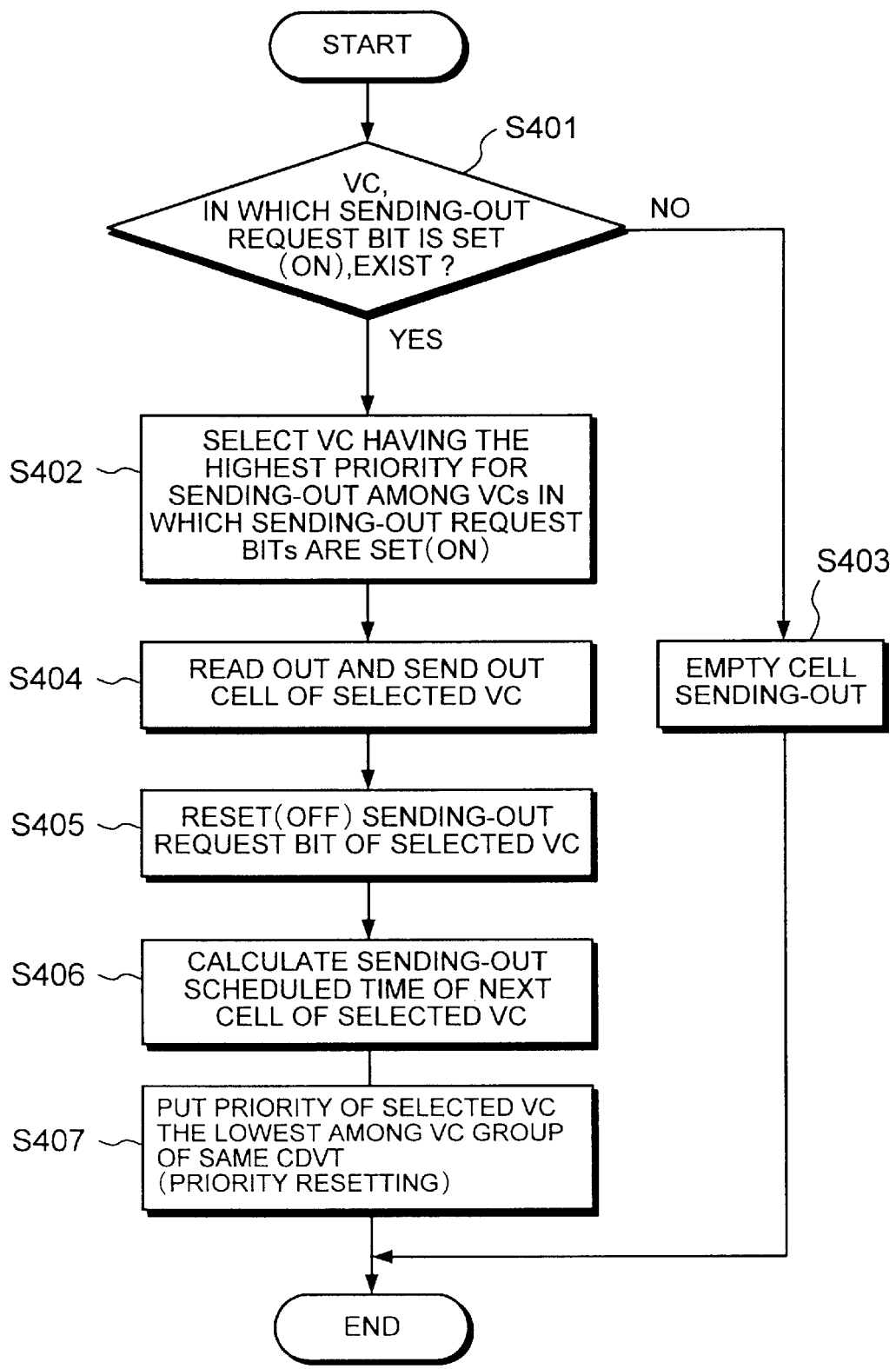
FIG. 10 is a flow chart showing a selection process of a virtual connection sending out a cell in the second embodiment of the present invention.

FIG. 10 is a flow chart showing a selection process of a virtual connection for which a cell is to be sent out of the second embodiment of the present invention. Referring to FIG. 10, a point of difference from the operation of the first embodiment of the present invention shown in FIG. 9 is the point in which a process (step S407) that the priority of the selected virtual connection, for which an operation of a cell sending-out has been completed, is renewed to the lowest position among the group of virtual connections having the same CDVT in the priority table 51 is added. The other is the same as the operation of the first embodiment of the present invention.

By this process, as the priority for the virtual connections having the same CDVT is changed (circulated), the uniformity of the priority for each virtual channel is realized, and as the result, an impartiality of the quality of service (Quality of Service: hereinafter called QOS) in the virtual connections having the same CDVT can be secured.

Next, the third embodiment of the present invention will be described in detail with reference to drawings.

Figure 2:
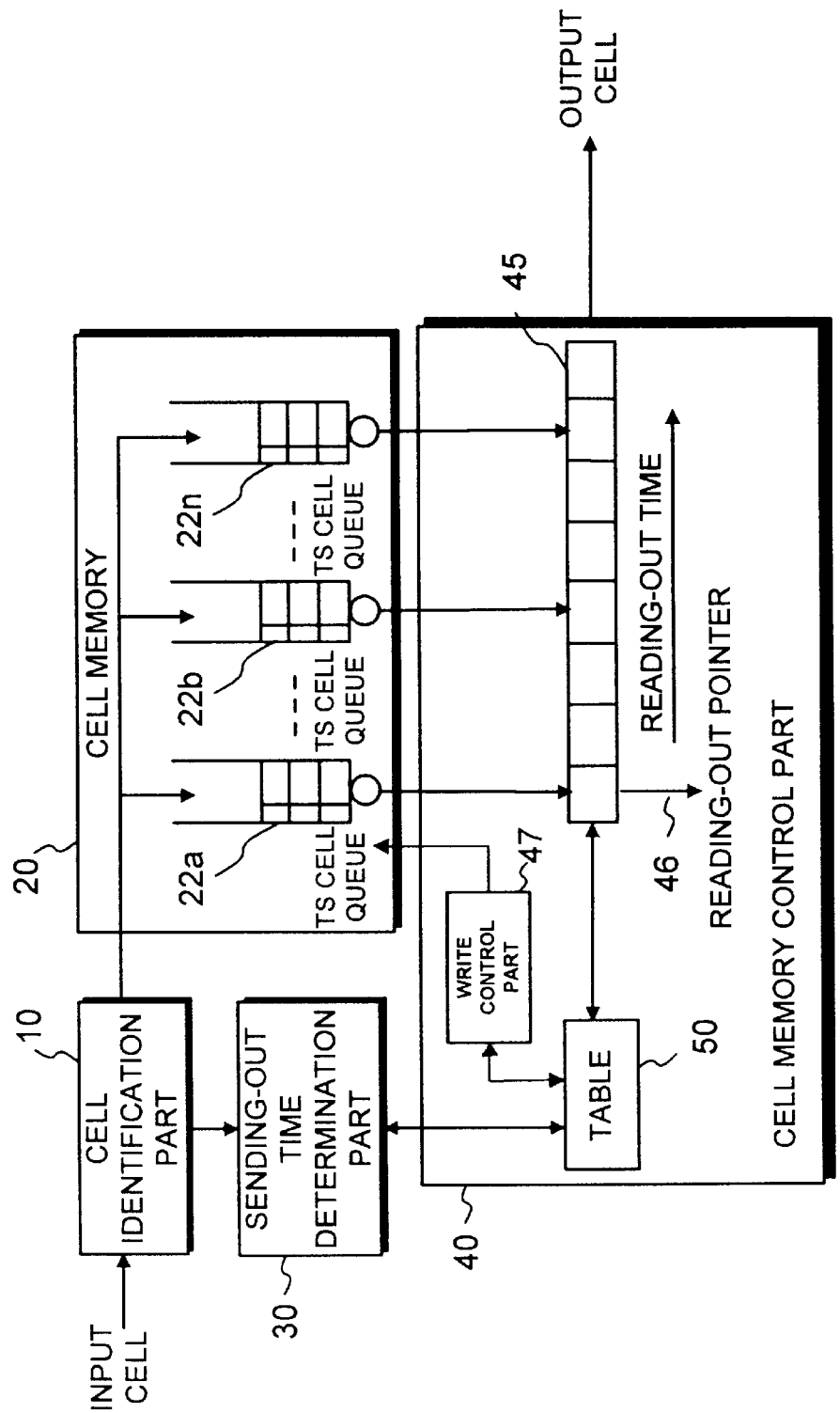
FIG. 2 is a block diagram showing the construction of a traffic shaper according to the third embodiment of the present invention.

FIG. 2 is a block diagram showing the construction of a traffic shaper that is the third embodiment of the present invention. In FIG. 2, parts same as or similar to those of the above FIG. 1 are denoted by the same references. Referring to FIG. 2, the third embodiment of the present invention comprises a cell identification part 10, a cell memory 20, a sending-out time determination part 30 and a cell memory control part 40.

The cell memory 20 comprises a time slot (TS) cell queue 22a–n that is a virtual queue for each sending-out scheduled time.

The cell memory control part 40 comprises a table 50, reading-out time slots 45 corresponding to sending-out scheduled times, a reading-out pointer 46 and a write control part 47. Hereinafter, the detail of the structure of the table 50 will be shown.

FIG. 6 is an explanatory view showing an example of a time slot/buffer state table 53 provided in the third embodiment of the present invention. Referring to FIG. 6 and the above FIGS. 4 and 5, the table 50 comprises the priority table 51 on which reading-out priorities, CDVTs and VPI/VCI are written, the sending-out time schedule/buffer state table 52 on which VPI/VCI and sending-out times of cells are written, and the time slot/buffer state table 53 on which empty flags of the time slot cell queue 22a–n and sending-out time slots of cells are written. In the third embodiment of the present invention, the empty flags of the virtual channel cell queue 21a–n and the sending-out demand bits in the sending-out time schedule/buffer state table 52 are not used.

Next, the operation of the third embodiment of the present invention will be described in detail with reference to the drawings.

Referring to FIG. 4, when a virtual connection is newly established, the reading-out priority is determined so that the smaller the CDVT of the virtual connection is, the higher the reading-out priority is. The priority table 51 is then renewed. In FIG. 4, a smaller priority number is given to a higher priority virtual connection.

Referring to FIGS. 2, 4, 5 and 6, when a cell arrives this traffic shaper, after the virtual connection of the cell is identified by the cell identification part 10, the sending-out scheduled time of the corresponding cell is determined in the sending-out time determination part 30. The calculation algorithm of the sending-out scheduled time of the virtual connection calculated in the sending-out time determination part 30 may be a known sending-out scheduled time calculation algorithm.

After then, the cell is stored in the corresponding time slot cell queue among the time slot cell queues 22a–22n on the basis of the above sending-out scheduled time and the reading-out priority of the corresponding cell shown in the priority table 51. Upon storing, if the empty flag of the corresponding cell sending-out time slot of the time slot/buffer state table 53 is empty (E), it is changed to full (F). These operations are performed by the write control part 47 in the cell memory control part 40.

The stored cell is read out from the time slot cell queue 22 which is indicated by the reading-out pointer 46, and then output from this traffic shaper. The reading-out pointer 46 moves on the reading-out time slots 45 in the cell memory control part 40 in order, and indicates the time slot cell queue from which a cell is to be read out at that time. Upon reading out, if the time slot cell queue 22 of the corresponding time becomes empty, the empty flag of the corresponding cell sending-out time slot of the time slot/buffer state table 53 is changed from full (F) to empty (E).

Hereinafter, the storage process operation of cells to the time slot cell queue 22 which is performed by the write control part 47 will be described.

FIGS. 3(A) and (B) are explanatory views showing an example of the storage process operation of cells to the time slot cell queue 22. Referring to FIGS. 3(a) and (B) and FIG. 4, in the beginning, as shown in FIG. 3(A), stored cells 24a and 24b and priority order labels 23a and 23b corresponding to those, respectively, are stored in the time slot cell queue 22. The cell locating lower is read out earlier. Suppose that a cell 24c having a priority order label 23c newly arrives there. The priority order label 23c is the label added based on the priority table 51. In the example, the priority of the cell 24c is 2, the priority of the stored cell 24a is 1, and the priority of the cell 24b is 3. The cell 24c is thus stored between the cells 24a and 24b as shown in FIG. 3(B). Reading out cells is performed in order from lower location of the queue. In case of storing cells as shown in FIG. 3(B), they are thus read out in order of cells 24a, 24c and 24b.

While the sending-out scheduled time of an arriving cell is not yet determined at the time when the cell arrives and the sending-out scheduled time is determined after storing in the cell memory in the first and second embodiments of the present invention, the sending-out scheduled time of the arriving cell is calculated at the time when the cell arrives and the cell is stored in the time slot cell queue according to the sending-out scheduled time in the third embodiment of the present invention. Also in a traffic shaper of such architecture as the sending-out scheduled time is determined in advance, it becomes possible to select sending out a cell on the basis of the priority by CDVT.

Although the priority in the priority table 51 is determined based on CDVT in any of the first, second and third embodiments, the priority may be determined based on the peak cell rate (PCR) of each virtual connection. In this case, a similar effect can be obtained by establishing the priority in order of the PCR decreasing (cell intervals increasing).

Besides, although any of the first, second and third embodiments has the construction that the priority table 51 and the sending-out time schedule/buffer state table 52 are separated from each other, a similar effect can be obtained by a method in which they are managed as one table.

According to the present invention, in a traffic shaper dealing with plural virtual connections in which cells are accumulated for each virtual connection and an output competition control of cell is performed based on the priority established by virtual connection to reproduce the cell output intervals, an effect of controlling the cell delay variation in accordance with the priority is obtained.

Besides, in the above traffic shaper, by adding the process for renewing the priority of the selected virtual connection to the lowest position among the group of virtual connections having the same priority, the priorities circulate in the virtual connections having the same priority. As a result, because the uniformity of the priorities can be intended, an effect of securing the impartiality of the quality of service in the virtual connections having the same priority is obtained.

Besides, in a traffic shaper dealing with plural virtual connections in which an output competition control of cell is performed by storing a cell in a virtual queue for each sending-out scheduled time on the basis of the priority established by virtual connection, and cell output intervals are reproduced by reading out the cell from the virtual queue by sending-out scheduled time, an effect of controlling the cell delay variation in accordance with the priority is obtained.

For example, in case of performing the competition control of cell output by the cell delay variation tolerance of each virtual connection as the priority, if a virtual connection of a small cell delay variation tolerance and a virtual connection of a large cell delay variation tolerance compete in cell output with each other, by sending out a cell so that the virtual connection of the small cell delay variation tolerance is prior, an effect of controlling the cell delay variation of the virtual connection of the small cell delay variation tolerance is obtained.

Besides, in case of performing the competition control of cell output by the peak cell rate of each virtual connection as the priority, if a virtual connection of a large peak cell rate and a virtual connection of a small peak cell rate compete in cell output with each other, by sending out a cell so that the virtual connection of the large peak cell rate is prior, an effect of controlling the cell delay variation of the virtual connection of the large peak cell rate is obtained.

Thus in case of the same network resources present, it becomes possible to accommodate more virtual connections so an effect of improving the coefficient of utilization of the network resources is obtained.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A traffic shaper for absorbing a cell delay variation of cell flow in each of virtual connections in an ATM (asynchronous transmission mode) network, said traffic shaper comprising:

a cell identification part for identifying a virtual connection allocated to an input cell;

a cell memory for storing input cells into respective virtual queues, each corresponding to the virtual connection, in accordance with the identified virtual connection of each input cell;

a sending-out time determination part for determining a sending-out time for each cell stored in the cell memory on the virtual connection basis; and a cell memory control part for performing a cell output from each virtual queue in accordance with the sending-out time determined for each cell, and performing an output competition control by selecting a cell to be output among cells having the same sending-out time in different virtual queues in accordance with a predetermined output priority assigned to each virtual connection, wherein said cell memory control part comprises:
a priority table for indicating an output priority for each virtual connection currently being established;
a virtual queue state table for indicating each virtual queue state including information of an existence of a cell in the queue, sending-out scheduled time determined for the queue and a presence of a cell sending-out request for the queue; and a cell sending-out control part for setting a cell sending-out request for each virtual queue in the virtual queue state table when corresponding information indicating cell existence in the queue and the sending-out scheduled time is now or past, selecting a virtual queue, among virtual queues for which a cell sending-out request being set in the virtual queue state table, corresponding to the virtual connection having the highest predetermined output priority, and sending out a cell from the selected virtual queue.

2. The traffic shaper of claim 1, wherein said predetermined output priority assigned to each virtual connection is determined by at least one of an allowable peak cell rate for each virtual channel and an allowable cell delay variation tolerance for each virtual channel.

3. The traffic shaper according to claim 1, wherein, said predetermined output priority assigned to each virtual connection is determined by an allowable cell delay variation tolerance for each virtual channel.

4. The traffic shaper of claim 3, wherein, when a cell is transmitted for a first virtual channel having a first value for said allowable cell delay variation tolerance, said output priority assigned to said first virtual channel is changed to be a priority lower than that of any virtual connection that also has said first value for said allowable cell delay variation tolerance.

5. The traffic shaper according to claim 1, wherein, said predetermined output priority assigned to each virtual connection is determined by an allowable peak cell rate for each virtual channel.

6. The traffic shaper of claim 5, wherein, when a cell is transmitted for a first virtual channel having a first value for said allowable peak cell rate, said output priority assigned to said first virtual channel is changed to be a priority lower than that of any virtual connection that also has said first value for said allowable peak cell rate.

7. A method of shaping traffic in an asynchronous transmission mode (ATM) network, said method based on a time-slot cell queue, said method comprising:

establishing a priority table for indicating an output priority for each virtual connection currently being processed, wherein a priority for each said virtual connection is established based on an allowable parameter for each said virtual connection;

establishing a virtual queue state table for indicating each virtual queue state for each said virtual connection currently being processed, said virtual queue state table including a sending-out scheduled time determined for the queue;

establishing a time slot/buffer state table, said state table including an existence of a cell in each of a time slot;

establishing in a memory a time slot cell queue, said time slot cell queue comprising a virtual queue for each said sending-out scheduled time;

establishing a reading-out time schedule and a memory pointer for said reading-out time schedule, said reading-out time schedule providing a sequential schedule of time slots for all said virtual connections currently being processed; and for each input cell received:
  identifying a virtual connection allocated to said input cell from a cell identification portion of said input cell;
  calculating, if said input cell is a first input cell received for said virtual connection, a priority for said virtual connection and storing said priority in said priority table;
  calculating a sending-out time for said input cell;
  ensuring a status of said time slot/buffer state table to be "full" for said virtual connection; and
  storing said input cell into said time slot cell queue.

8. The method of claim 7, further comprising:

from said reading-out time schedule, determining whether a reading-out scheduled time has been reached or passed for any of said time slots;

from said virtual queue state table, determining whether more than one said time slot has a scheduled time indicating a cell should be transmitted; and using said priority table to determine which cell has a higher priority.

* * * * *